(12) United States Patent
Sekiyama et al.

(10) Patent No.: US 10,772,306 B2
(45) Date of Patent: Sep. 15, 2020

(54) SYSTEM AND METHOD MAINTAINING FISH AND SHELLFISH IN ANESTHETIC STATE, AND METHOD OF TRANSPORTING FISH AND SHELLFISH MAINTAINED IN ANESTHETIC STATE

(71) Applicant: NIKKEN LEASE KOGYO CO., LTD., Tokyo (JP)

(72) Inventors: Tadakatsu Sekiyama, Tokyo (JP); Michio Ohmori, Tokyo (JP); Shousuke Watanabe, Tokyo (JP); Yukihiro Yoshida, Tokyo (JP)

(73) Assignee: NIKKEN LEASE KOGYO CO., LTD., Tokyo (JP)

( * ) Notice: Subject to any disclaimer, the term of this patent is extended or adjusted under 35 U.S.C. 154(b) by 0 days.

(21) Appl. No.: 16/703,147

(22) Filed: Dec. 4, 2019

(65) Prior Publication Data

US 2020/0100477 A1    Apr. 2, 2020

Related U.S. Application Data

(63) Continuation of application No. PCT/JP2017/022147, filed on Jun. 15, 2017.

(51) Int. Cl.
*A01K 63/02* (2006.01)
*A01K 63/04* (2006.01)
(Continued)

(52) U.S. Cl.
CPC ............ *A01K 63/02* (2013.01); *A01K 63/042* (2013.01); *A61D 7/00* (2013.01); *B01F 3/04099* (2013.01); *B01F 2003/04879* (2013.01)

(58) Field of Classification Search
None
See application file for complete search history.

(56) References Cited

U.S. PATENT DOCUMENTS 4,807,615 A     2/1989  Nakagawa et al.
5,205,237 A *   4/1993  Skeggs ................ A01K 63/042
                                                                119/226
(Continued)

FOREIGN PATENT DOCUMENTS

FR       3035298 A1      10/2016
JP       52-042720 B2    10/1977
(Continued)

OTHER PUBLICATIONS

Pramod et al. Effects of Two Anesthetics on Water Quality during Simulated Transport of a Tropical Ornamental Fish, the Indian tiger barb Puntius filamentosus. North American Journal of Aquaculture 72:290-297, 2010 (Year: 2010).*

(Continued)

*Primary Examiner* — Magdalena Topolski
*Assistant Examiner* — Morgan T Barlow
(74) *Attorney, Agent, or Firm* — Tracy M. Heims; Apex Juris, pllc

(57) ABSTRACT

A system for maintaining fish and shellfish in an anesthetic state, the system includes at least: an anesthetic tank configured to allow the fish and shellfish to be so anesthetized as to be in an anesthetic state; and a maintenance tank configured to allow the fish and shellfish anesthetized in the anesthetic tank to be maintained in the anesthetic state while being transported, wherein, in the anesthesia tank, a carbon dioxide concentration is maintained higher than or equal to 65 ppm as well as lower than or equal to 85 ppm, and an oxygen concentration is maintained higher than or equal to 60%, and wherein, in the maintenance tank, a carbon dioxide concentration is maintained higher than or equal to 10 ppm as well as lower than or equal to 40 ppm, and an oxygen concentration is maintained higher than or equal to 60%.

13 Claims, 3 Drawing Sheets

(51) Int. Cl.
  *A61D 7/00* (2006.01)
  *B01F 3/04* (2006.01)

(56) References Cited

U.S. PATENT DOCUMENTS

| | | | | |
|---|---|---|---|---|
| 5,606,935 | A * | 3/1997 | Hanrahan | A01K 63/02 119/203 |
| 5,961,831 | A * | 10/1999 | Lee | A01K 63/042 210/614 |
| 7,210,425 | B1 * | 5/2007 | Battle | A01K 63/02 119/203 |
| 2004/0149233 | A1 * | 8/2004 | Cummins | A01K 63/04 119/227 |
| 2007/0022966 | A1 * | 2/2007 | Torring | A01K 63/02 119/201 |
| 2016/0066578 | A1 * | 3/2016 | Ala'aldeen | A61Q 11/00 424/404 |

FOREIGN PATENT DOCUMENTS

| | | |
|---|---|---|
| JP | 64-060321 A | 3/1989 |
| JP | 01-144916 A | 6/1989 |
| JP | 4951736 B2 | 6/2012 |
| JP | 2014-039514 A | 3/2014 |
| JP | 5897133 B2 | 3/2016 |
| JP | 2017-023023 A | 2/2017 |
| WO | WO2018/229940 A1 | 12/2018 |

OTHER PUBLICATIONS

Kugino et al. Long-Duration Carbon Dioxide Anesthesia of Fish Using Ultra Fine (Nano-Scale) Bubbles. Apr. 21, 2016. PLoS One. 2016; 11(4). (Year: 2016).*
Dickson, Andrew. Introduction to CO2 Chemistry in Sea Water. Scripps Institution of Oceanography, UC San Diego, May 9, 2016. (Year: 2016).*
International Search Report for PCT/JP2017/022147, dated Sep. 5, 2017, Total of 4 pages.
English translation of written opinion of the international searching authority, dated Sep. 5, 2017, Total of 6 pages.
A Basic Overview of Aquaculture by LaDon Swann, Issued in Aug. 1992, Total of 11 pages.
Extended European Search Report, dated Jun. 9, 2020, in counterpart European Patent Application No. 17913501.7, 10 pages.

* cited by examiner

Oxygen Concentration: 99%-80%

| | Model No. 1 | | Model No. 2 | | Model No. 3 | | Model No. 4 | | Model No. 5 | |
|---|---|---|---|---|---|---|---|---|---|---|
| $CO_2$ concentration | 0~20ppm | | 10~30ppm | | 20~40ppm | | 30~50ppm | | 40~60ppm | |
| | at gal. onto base | after 24 hrs | at gal. onto base | after 24 hrs | at gal. onto base | after 24 hrs | at gal. onto base | after 24 hrs | at gal. onto base | after 24 hrs |
| pH | 6.77 | 6.73 | 6.7 | 6.88 | 6.7 | 6.74 | 6.7 | 6.76 | 6.73 | 7.34 |
| $NH_3$ [ppm] | 0 | 0.01 | 0 | 0.01 | 0 | 0 | 0 | 0 | 0.01 | 0.13 |
| $NH_4^+$ [ppm] | 0.1 | 0.17 | 0.24 | 5.96 | 0.12 | 1.23 | 0.22 | 1.23 | 7.92 | 15.69 |
| RESULTS survival rate | 5/5 | | 5/5 | | 5/5 | | 3/5 | | 0/5 | |

Oxygen Concentration: 80%-60%

| | Model No. 6 | | Model No. 7 | | Model No. 8 | | Model No. 9 | | Model No. 10 | |
|---|---|---|---|---|---|---|---|---|---|---|
| $CO_2$ concentration | 0~20ppm | | 10~30ppm | | 20~40ppm | | 30~50ppm | | 40~60ppm | |
| | at gal. onto base | after 24 hrs | at gal. onto base | after 24 hrs | at gal. onto base | after 24 hrs | at gal. onto base | after 24 hrs | at gal. onto base | after 24 hrs |
| pH | 7.03 | 7.31 | 7.31 | 8.23 | 7.32 | 8.24 | 6.22 | 6.33 | 8.14 | 8.41 |
| $NH_3$ [ppm] | 5.03 | 0.09 | 0 | 0.01 | 0 | 0.01 | 0 | 0.16 | 0 | 0.12 |
| $NH_4^+$ [ppm] | 5.86 | 11.49 | 0.43 | 10.96 | 0.27 | 11.92 | 0.12 | 14.42 | 0.23 | 12.60 |
| RESULTS survival rate | 4/5 | | 6/5 | | 2/5 | | 0/5 | | 1/5 | |

Oxygen Concentration: 60%-30%

| | Model No. 11 | | Model No. 12 | | Model No. 13 | | Model No. 14 | | Model No. 15 | |
|---|---|---|---|---|---|---|---|---|---|---|
| $CO_2$ concentration | 0~20ppm | | 10~30ppm | | 20~40ppm | | 30~50ppm | | 40~60ppm | |
| | at gal. onto base | after 24 hrs | at gal. onto base | after 24 hrs | at gal. onto base | after 24 hrs | at gal. onto base | after 24 hrs | at gal. onto base | after 24 hrs |
| pH | 7.2 | 7 | 7 | 6.8 | 6.8 | 6.78 | 6.8 | 6.78 | 6.4 | 6.64 |
| $NH_3$ [ppm] | 0 | 0.01 | 0 | 0.01 | 0 | 0 | 0 | 0 | 0 | 0 |
| $NH_4^+$ [ppm] | 0.14 | 0.72 | 0.11 | 6.52 | 0.26 | 6.2 | 0.08 | 0.21 | 0.08 | 0.37 |
| RESULTS survival rate | 0/5 | | 0/5 | | 0/5 | | 0/5 | | 0/5 | |

FIG. 3

SYSTEM AND METHOD MAINTAINING FISH AND SHELLFISH IN ANESTHETIC STATE, AND METHOD OF TRANSPORTING FISH AND SHELLFISH MAINTAINED IN ANESTHETIC STATE

CROSS REFERENCE TO RELATED APPLICATIONS

This is a continuation application of International Patent Application No. PCT/JP2017/022147 filed on Jun. 15, 2017, of which full contents are incorporated herein by reference.

BACKGROUND OF THE INVENTION

Field of the Invention

The present invention relates to various methods relating to anesthesia maintenance of fish and shellfish such as live fish for food.

Description of the Background Art

As to how to anesthetize fish and shellfish, methods described in the patent documents below have been known.

Patent Document 1 discloses a technology of anesthetizing fish by supplying carbonated water for anesthesia to a water tank, where the carbonated water contains carbon dioxide dissolved in concentration sufficient to produce an anesthetic effect, and oxygen dissolved in concentration necessary for fish to survive.

Patent Document 2 relates to a problem that, even when dissolved oxygen is maintained in a saturated concentration in the carbonated water for anesthesia as disclosed in Patent Document 1, the amount of oxygen to be absorbed through the gills of fish is insufficient to prevent death, and discloses a technology for supplying oxygen gas microbubbles sized such that gaseous oxygen is held at a certain depth in water without floating up thereby preventing sudden death of the fish and shellfish.

Patent Document 3, in a similar fashion to Patent Document 2, addresses defects in the carbonated water for anesthesia disclosed in Patent Document 1, by employing a large-scale device needed to perform the method disclosed in Patent Document 2, and determine appropriate levels for the amount of dissolved oxygen and the diameter of a pore of a tubular diffuser, through which a gas containing carbon dioxide and oxygen is ejected into water wherein dissolved oxygen is.

PRIOR ART DOCUMENTS

Patent Documents

Patent Document 1: Japanese Patent No. 4951736
Patent Document 2: Japanese Patent No. 5897133
Patent Document 3: Japanese Unexamined Patent Application Publication No. 2017-23023

Problems to be Solved

While conducting research on conventional technologies, the applicant has found that there is a need for improvements with respect to:

(1) reducing toxic components within the water tank to prevent sudden death of the fish and shellfish;

(2) enabling the fish and shellfish to be transported for a long period of time while in an anesthetic state and prevented from sudden death;

(3) enabling the fish and shellfish in the anesthetic state to be prevented from sudden death even if the amount of dissolved oxygen within the water tank does not reach the saturated level; and (4) enabling the fish and shellfish in the anesthetic state to be prevented from sudden death even if the gaseous oxygen supplied to the fish and shellfish in the anesthetic state is not encapsulated in the form of microbubbles.

SUMMARY OF THE INVENTION

Means for Solving Problems

In order to solve the above-described problems, the invention in the present application includes at least one or more of the following technical feature(s):

(1) the adjustment of a carbon dioxide concentration, within a water tank having stored therein fish and shellfish in an anesthetic state, such that a reaction from ammonia molecules ($NH_3$) to ammonium molecular ions ($NH_4^+$) is promoted, where the adjustment of the carbon dioxide concentration may be made by aeration;

(2) the use of a protein skimmer for removing proteins included in wastes and remaining feed of the fish and shellfish to reduce the buildup of ammonia ($NH_3$);

(3) the separation of an underwater environment in a step of anesthetizing the fish and shellfish from a different underwater environment in a step of maintaining the fish and shellfish in the anesthetic state; and (4) the anesthetization of the fish and shellfish within an anesthetic tank and transportation in a maintenance tank to a port or like target destination where awakening of the fish and shellfish in the anesthetic state at a transportation destination occurs.

Advantageous Effects of the Invention

According to the invention in the present application, at least any one of the following advantageous effects could be achieved.

(1) Decrease in amount of the generated ammonia.

An increase in ammonia concentration in water within a water tank could be suppressed by adjusting a carbon dioxide concentration within the water tank so as to convert ammonia ($NH_3$) to ammonium ion ($NH_4$) of low toxicity and thereby reduce the ammonia intoxication of fish and shellfish.

(2) Suppression of ammonia ($NH_3$) generated by proteins.

The buildup of ammonia generated by bacteria's decomposition of proteins could be suppressed by arranging a protein skimmer within a maintenance tank for removing proteins made of wastes and remaining feed of the fish and shellfish. As a result, the ammonia poisoning of the fish and shellfish for food is reduced.

(3) The fish and shellfish for food could thereby be maintained in the anesthetic state for a prolonged time.

As a result of appropriate setting of the underwater environment in each individual step of: anesthetizing the fish and shellfish; and maintaining the anesthetized fish and shellfish in the anesthetic state, the fish and shellfish could be prevented from suffering from disease caused by gas, and could be maintained in an anesthetic state for a longer time until the fish and shellfish are awoken.

(4) Environmental maintenance management on each individual tank could easily be performed.

As a result of physically separating the water tank for anesthetizing the fish and shellfish (anesthetic tank) from the water tank for maintaining the anesthetic state of the anesthetized fish and shellfish (maintenance tank), the maintenance management on the oxygen concentration and the carbon dioxide concentration needed in each respective individual tank could easily be performed.

(5) Long distance transportation is facilitated.

As a result of designing the maintenance tank used for transportation specifically for the environment in which the anesthetic state of the fish and shellfish could be maintained for a long period of time, transportation to a distant destination where the fish and shellfish are awoken is enabled.

(6) Enhancement of transportation efficiency is facilitated.

In one embodiment, the maintenance tank configuration enables simultaneous transportation of multiple storage boxes having the fish and shellfish stored therein. Thus, the storage density of the fish and shellfish is elevated, thereby enhancing the transportation efficiency.

BRIEF DESCRIPTION OF THE DRAWINGS

FIG. 3 depicts a table with a summary of the experimental results with respect to the anesthesia maintenance method according to the present invention.

DETAILED DESCRIPTION OF EMBODIMENTS OF THE INVENTION

[1] Contributory Factor to Sudden Death of Fish and Shellfish

Figure 1:
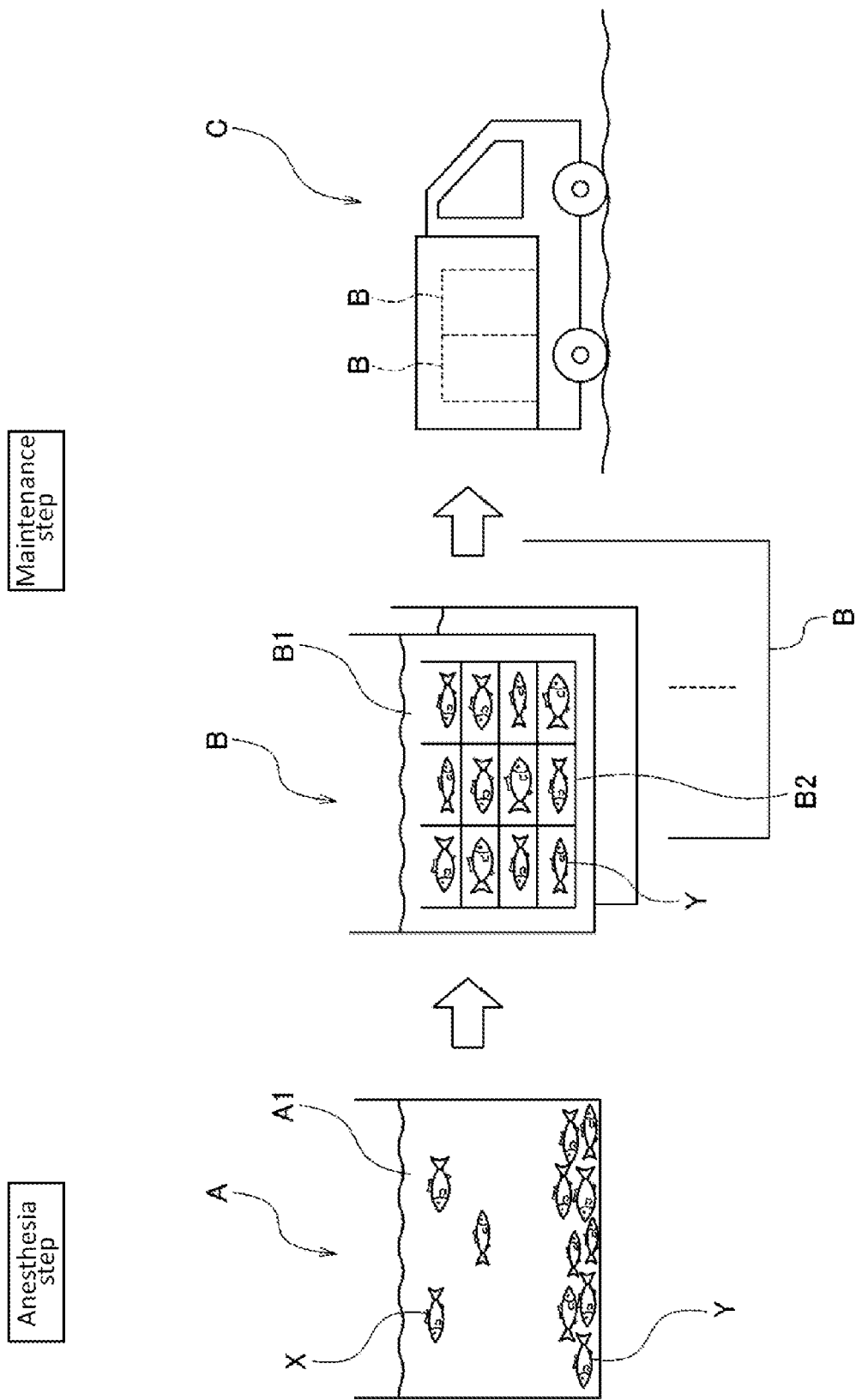
FIG. 1 depicts a schematic diagram showing an anesthesia maintenance method according to the present invention.
Figure 2:
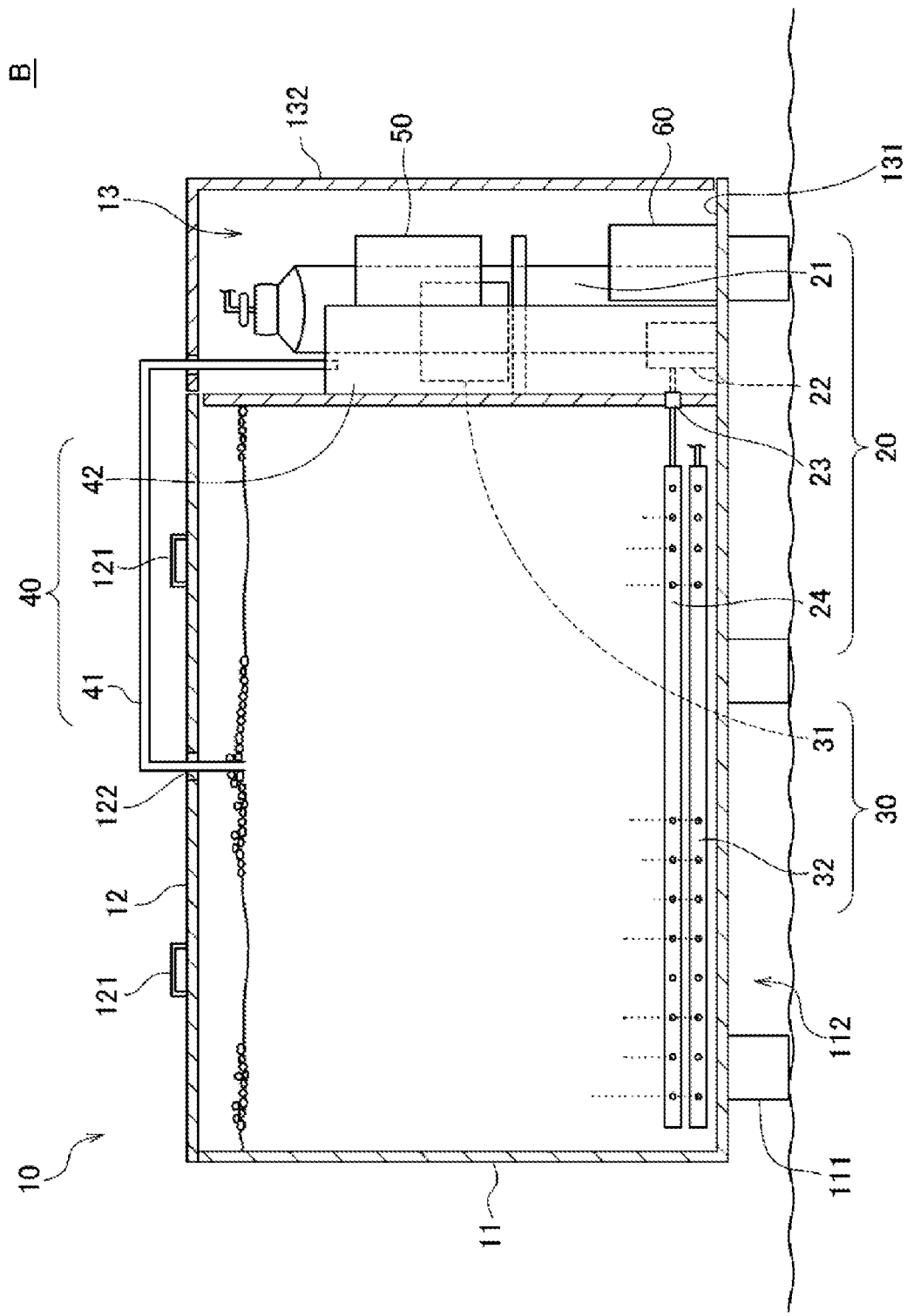
FIG. 2 depicts a schematic view showing a maintenance tank according to the present invention.

In a process of performing experiments to study whether or not fish and shellfish die suddenly after an elapsed time of 24 hours from their anesthetization, in underwater environments with predetermined oxygen concentrations and carbon dioxide concentrations within a water tank, as depicted in FIGS. 1-3, irrespective of the presence of an oversaturated state of the oxygen concentration in water, the occurrence of an event of their sudden death is related to the concentration of ammonia ($NH_3$) within the water tank that may be attributed to several factors.

It is known that, when the ammonia concentration in water is high, a problem occurs in the respiration of the fish and shellfish, and as a result, the fish and shellfish die due to dyspnea.

It is also known that ammonia is generated not only due to urine of the fish and shellfish but also in a process of bacteria's decomposition of proteins included in wastes and remaining feed of the fish and shellfish in water.

As a result, a hypothesis has been derived that the more tightly the fish and shellfish are stored within the water tank, the more likely the ammonia concentration would increase, which would result in harsh environments for the fish and shellfish.

[2] Method of Rendering Ammonia Harmless

Incidentally and to explain the chemical reactions employed by the methodology described and claimed herein, by allowing ammonia ($NH_3$) to be dissolved in water, an ammonia molecule is bonded with an ionic hydrogen atom ($H^+$) in the water so that it could be changed into an ionic ammonium molecule ($NH_4^+$) that is harmless, and in other words, the ammonia ($NH_3$) could be rendered harmless.

On the basis of such phenomena, if the concentration of hydrogen ion ($H^+$) could be adjusted to increase or decrease within the water tank, it is possible to control a protonation reaction from ammonia molecules ($NH_3$) to ammonium molecular ions ($NH_4^+$).

[2.1] Relation Between Hydrogen Ions and pH

A further known principle relevant to the present invention relates to the concentration of hydrogen ions ($H^+$) described above could be represented as a value of pH in water, and is defined by such a relation that the lower a value of pH is, the higher a hydrogen-ion concentration is.

It has therefore been known that, as a function of pH, a rate of change from the ammonia molecules ($NH_3$) into the ammonium molecular ions ($NH_4^+$) increases or decreases.

In particular, when pH is, e.g., 6 (weak acid), a 99.9% fraction of ammonia ($NH_3$) is changed into ionic ammonium ($NH_4^+$).

Further, when pH is 7 (neutral), a 99.4% fraction of ammonia ($NH_3$) is changed into ionic ammonium ($NH_4^+$).

[2.2] Relation Between pH and Ammonia Concentration

As a result of the above, when a value of pH in water increases (i.e., hydrogen-ion concentration is lower), a decrease in rate of change from ammonia ($NH_3$) into ionic ammonium ($NH_4^+$) facilitates the dissolved ammonia present with its increasing concentration in water, which results in sudden death of the fish and shellfish.

[3] Method of Reducing Increase in Ammonia Concentration

Therefore, as an exemplary embodiment of a methodology for an improved system for transporting anesthetized fish and shellfish in a series of steps as hereinafter described and claimed whereby suppressing an increase of pH in water results from adjusting a carbon dioxide concentration in water, a series of steps and the resulting efficacies addressing problems with conventional techniques are described below.

[3.1] Generation of Hydrogen Ions from Carbon Dioxide Molecules (1) Carbon dioxide ($CO_2$)+Water ($H_2O$)→Carbonic acid ($H_2CO_3$)

*Unstable $H_2CO_3$ is immediately decomposed into the followings.

(2) Carbonic acid ($H_2CO_3$)→Hydrogen ion ($H^+$)+Hydrogen carbonate ion ($HCO_3^-$)

*Hydrogen ion ($H^+$) increases, thereby reducing pH in water.

Thus, by adjusting the amount of carbon dioxide dissolved in water to fall within a predetermined range, the number of hydrogen ions in the water could also be adjustable thereby changing toxic ammonia molecules ($NH_3$) into harmless ammonium molecular ions ($NH_4^+$) in the water.

[3.2] Determinant Factors of Carbon Dioxide Concentration

The concentration of carbon dioxide within the water tank is varied by internal factors shown below:

(Internal factor 1) generated through the respiration of the fish and shellfish; and (Internal factor 2) generated as a result of the elution of a substance from blood of the fish and shellfish in an anesthetic state.

Therefore, by calculating a carbon dioxide concentration within the water tank on the basis of internal factors 1 and 2 that determine concentration variations, and adjusting the concentration obtained as a result of calculation through the use of external factors such as aeration, it is possible to maintain an appropriate concentration of carbon dioxide.

Thus, by adjusting the carbon dioxide concentration within the water tank to fall within an appropriate range so that pH in water could be maintained at a relatively low value, a rate of change from the ammonia molecules ($NH_3$) into the ammonium molecular ions ($NH_4^+$) could be maintained at a relatively high value, and as a result, the amount of dissolved ammonia molecules of highly toxicity could be reduced, thereby capable of preventing sudden death of the fish and shellfish.

[4] Other Variations

It is to be noted that, in the present invention, the method described above is merely an example. If there is any known method that could be considered as a method of controlling an environment so as to reduce an increase of ammonia molecules ($NH_3$) within a water tank, such a method may be adopted.

EXAMPLE 1

Exemplary embodiments according to the present invention based upon the above will be described, hereinafter, with reference to the drawings.

It is to be noted that "carbon dioxide concentration" and "oxygen concentration" which will be described later include not only a concentration obtained at a time of measurement but also the average of a plurality of concentrations obtained simultaneously at a plurality of measurement points and the average of a plurality of concentrations obtained chronologically at a plurality of times of measurement.

The carbon dioxide concentration is expressed in ppm, and the oxygen concentration is expressed as a percentage (%) with reference to the saturated level of dissolved oxygen.

[1] Overall Configuration

An anesthesia maintenance method in an example of embodiments according to the present invention includes, as shown in FIG. 1, at least an anesthesia step and a maintenance step, and in the individual steps, different water tanks (anesthetic tank A, maintenance tank B) are used.

In the anesthesia step, landed fish and shellfish for food X in an awaking state are put into the anesthetic tank A constantly placed at a port or the like, having been filled with anesthetic water A1, so that the fish and shellfish for food X are rendered as the fish and shellfish for food Y in an anesthetic state.

In the maintenance step, the fish and shellfish for food Y in the anesthetic state within the anesthetic tank A are transferred, through the use of appropriate transfer means, to the maintenance tank B having maintenance water B1 filled therewith, as a transportation target, so as to be maintained in the anesthetic state in the maintenance water B1.

In transferring the fish and shellfish for food Y in the anesthetic state to the maintenance tank B, storage boxes B2 or the like may be used so that the storage density of the fish and shellfish Y could be elevated.

The purpose in the maintenance step is transportation of the maintenance tank B through the use of transportation means C such as a transportation truck, and awakening of the fish and shellfish for food Y in the anesthetic state at a transportation destination, thereby capable of maintaining a state where the fish and shellfish for food Y are alive for a long period of time.

The reason why the water tanks are separated between the individual steps is based at least upon any one of the followings.

REASON 1: It is found that there are some differences between an underwater environment in which the fish and shellfish are so anesthetized as to be in the anesthetic state and an underwater environment in which the anesthetized fish and shellfish are maintained in the anesthetic state.

REASON 2: The anesthetic tank A is constantly placed at a port or the like as a transportation source of the fish and shellfish, while the maintenance tank B having the anesthetized fish and shellfish transferred from the anesthetic tank A is transported, thereby facilitating the long distance transportation, through the use of a vehicle or the like, of excellence in operation efficiency.

Detailed explanations of the step with respect to each individual tank will be provided hereinafter.

[2] Anesthesia Step

The anesthesia step is a step in which the fish and shellfish are anesthetized so as to be in the anesthetic state.

Among various methods known for anesthetizing the fish and shellfish, a method could be adopted, in the present invention, by which: the fish and shellfish are put into the anesthetic tank A filled with the anesthetic water A1 whose carbon dioxide concentration is higher than or equal to a certain level; and, after a predetermined time elapses, are so anesthetized as to be in the anesthetic state.

For this purpose, the anesthetic tank A used in an example of embodiments according to the present invention is preferably configured such that the tank shall be provided at least with a unit capable of adjusting the carbon dioxide concentration, and may be provided as necessary with other units capable of adjusting the oxygen concentration within the tank.

[2.1] Setting of Conditions of Anesthetic Water

In the present invention, the anesthetic water A1 within the anesthetic tank A is maintained in carbon dioxide concentration within a range of 65 to 85 ppm as well as in oxygen concentration higher than or equal to 60%.

Here, it is not essential that the oxygen concentration in the anesthetic water A1 be brought into an oversaturated state (100% or higher), and the oxygen concentration may be set higher than or equal to 60% but lower than 100%.

[3] Maintenance Step

In the maintenance step, the anesthetized fish and shellfish are maintained in the anesthetic state for a long period of time.

In exemplary embodiments according to the present invention, the maintenance tank B different and separate from the anesthetic tank A is used such that the tank maintains a carbon dioxide concentration lower at least than that in the anesthetic tank A so as to maintain the fish and shellfish in the anesthetic state.

FIG. 2 shows the details of the structure of the maintenance tank B.

The maintenance tank B mainly includes at least: a main body unit 10; an oxygen supply unit 20; and an aeration unit 30, and further includes, as necessary, a protein skimmer 40.

Detailed explanations of each individual constituent element will be provided hereinafter.

[3.1] Main Body Unit

The main body unit 10 is an element configured to store the fish and shellfish in the anesthetic state.

The main body unit 10 is preferably made to correspond to the standard and the shape of a known transportation container so that the unit is suitable for transportation by a forklift and known transportation equipment.

As to examples of how to store the fish and shellfish in the main body unit 10, there are various methods such as a method of scooping the fish and shellfish in the anesthetic state from the anesthetic tank A to a mesh and directly putting them from the mesh into the main body unit 10, and a method of densely storing the fish and shellfish in the storage boxes B2 like seabream baskets and subsequently putting the storage boxes B2 each having stored therein the fish and shellfish into the main body unit 10.

In exemplary embodiments according to the present invention, the main body unit 10 includes: a box member 11 opened at an upper portion thereof; a lid member 12 for closing the opened upper portion of the box member 11; and a storage unit 13 provided on a lateral side of the box member 11.

[3.1.1] Box Member

The box member 11 is an element for storing water within an interior portion thereof, and then capable of receiving the fish put into the stored water.

On an outside bottom portion of the box member 11, support stands 111 are arranged while having an appropriate space between each other so that gaps (fork insertion portions 112), which are defined by the outside bottom portion and the support stands 111, configured for facilitating the insertion of forks of a forklift.

[3.1.2] Lid Member

The lid member 12 is a member for closing the box member 11.

In the present invention, there are no particular limitations to the lid member 12 in configuration.

In exemplary embodiments according to the present invention, the lid member 12 is provided with a locking portion for lifting 121 on an upper portion thereof, and is perforated with a through hole 122 in a vertical direction.

The through hole 122 is used for allowing a suction hose 41 of a protein skimmer 40, which will be described below, to pass through the lid member 12.

[3.1.3] Storage Unit

The storage unit 13 is an element for storing therein various types of devices installed in the maintenance tank B.

The storage unit 13 is formed with a placement stage 131 extending an inside bottom portion of the box member 11 toward a lateral side, and is formed with a cover 132 so positioned as to surround the placement stage 131.

In the storage unit 13, there are not only stored an oxygen cylinder 21 and a pump 31 for aeration, which will be described later, but also stored devices such as a control panel 50, a battery 60, and sensors (not shown) used for the measurements of the oxygen concentration and the carbon dioxide concentration.

Through the use of various types of devices stored in the storage unit 13 of the maintenance tank B, the control of the underwater environment is maintained by the maintenance tank B on a standalone basis.

[3.2] Oxygen Supply Unit

The oxygen supply unit 20 is an element for supplying oxygen into the main body unit 10 so as to maintain the oxygen concentration within a predetermined range.

A known device capable of supplying oxygen into water could be adopted for such an oxygen supply unit 20.

In exemplary embodiments according to the present invention, the oxygen supply unit 20 includes: the oxygen cylinder 21 arranged outside the main body unit 10; a pump 22 configured to deliver gaseous oxygen from the oxygen cylinder 21; a mixing valve 23 for mixing the gaseous oxygen delivered by the pump 22 with water within the tank; and first nozzles 24 for injecting oxygen bubbles inside the main body unit 10.

A particle diameter of a gaseous oxygen bubble supplied from the first nozzles 24 is not particularly limited, and the so-called fine bubble having a diameter equal to or smaller than 1 μm is not required.

In exemplary embodiments according to the present invention, the first nozzles 24 are configured by adjusting each diameter and pressure such that the gaseous oxygen in the form of bubble having a diameter equal to or larger than 100 jam is ejected from the nozzles 24.

[3.3] Aeration Unit

The aeration unit 30 is an element for performing aeration of water inside the main body unit 10.

It is normally assumed that aeration of water includes delivery of air inside the main body unit 10 in the breeding of e.g. tropical fish in order to elevate the oxygen concentration inside the main body unit 10; on the other hand, in the present invention, it is used within the maintenance tank B as a unit for releasing carbon dioxide, which is eluted through the respiration of the fish and shellfish and is also generated as a result of the elution from the fish and shellfish, from the water.

A known aeration device could be adopted for the aeration unit 30.

In exemplary embodiments according to the present invention, the aeration unit 30 includes: the pump 31 stored in the storage unit 13; and second nozzles 32 for injecting air delivered by the pump 31 inside the main body unit 10.

In a similar fashion to the first nozzles 24, a particle diameter of an air bubble supplied from the second nozzles 32 is not particularly limited, and the fine bubbles are not necessarily required.

[3.3.1] Aeration and Oxygen Supply

It is to be noted that, in the present invention, one of the aeration unit 30 and the oxygen supply unit 20 may also serve as the other.

[3.4] Protein Skimmer

The protein skimmer 40 is an element for filtering out impurities inside the main body unit 10 so as to remove them.

The protein skimmer 40 is used, in the breeding of saltwater fish, as means for removing impurities not yet decomposed by bacteria such as proteins and lipids from water, by serving functions of: adsorbing the impurities on surfaces of bubbles generated through the use of the pump 31 for air; and collecting the impurities in an upper region of the water by utilization of the floating of the bubbles with the impurities up to a surface of the water.

In the present invention, a known device, at least configured to such an extent that it could achieve effects of removing proteins in water within the box member 11, could be adopted for the protein skimmer 40.

In exemplary embodiments according to the present invention, the protein skimmer 40 includes: the suction hose 41 having one end arranged within the interior portion of the box member 11 and having the other end connected to a reservoir portion 42; and the reservoir portion 42 for trapping sucked dirty water and bubbles.

[3.5] Setting of Conditions of Maintenance Water

Water to be stored within the box member 11 is obtained by pumping up seawater and adjusting the pumped-up seawater to be in a predetermined underwater environment through the use of the oxygen supply unit 20 and the aeration unit 30 described above.

More specifically, the water thus stored within the box member 11 is so adjusted as to be in carbon dioxide concentration lower than the anesthetic water A1 within the anesthetic tank A. In such adjustments, the maintenance water B1 may be applied in part with the anesthetic water A1 within the anesthetic tank A, as an alternative, for labor savings.

The oxygen concentration in the maintenance water B1 is set to be, as a target, similar in level to that set in the anesthetic water A1.

[4] Awaking Step

At the transportation destination not shown in FIG. 1, the aeration is performed through the use of the aeration unit 30 within the maintenance tank B in further elevated level, and as a result, the carbon dioxide concentration in water is caused to decrease appropriately, thereby releasing the fish and shellfish naturally from the anesthetic state.

During aeration of the awaking step, oxygen is supplied continuously through the use of the oxygen supply unit 20.

[5] Example of Experiments

Hereinafter is shown the experimental data as observation results of whether fish and shellfish are alive or dead after an elapsed time of 24 hours from a start of their anesthetization, as a function of underwater environments (such as the oxygen concentration and the carbon dioxide concentration) set in a various fashion, within the maintenance tank B in the maintenance step.

[5.1] Experimental Conditions

Experimental conditions are as follows.

Five red seabreams are used per model of each experimental condition.

The seabreams (representing fish and shellfish) are changed from an awaking state to an anesthetic state by maintaining them within the anesthetic tank A over a predetermined time after putting them in the awaking state into the anesthetic tank A, during which time an underwater environment within the anesthetic tank A has the oxygen concentration set as high as 99% and the carbon dioxide concentration maintained around 75 ppm. Thereafter, the seabreams (representing fish and shellfish) thus anesthetized to be in the anesthetic state are put into the maintenance tank B.

100 liters of seawater is put into the maintenance tank B.

The oxygen concentration in water within the maintenance tank B is adjusted to be a predetermined level by supplying oxygen bubbles whose diameter is equal to or larger than 100 jam, through the use of the oxygen supply unit 20, into the water.

The carbon dioxide concentration in water within the maintenance tank B is adjusted to be a predetermined level by supplying air through the use of the aeration unit 30 into the water.

The oxygen concentration and the carbon dioxide concentration within the maintenance tank B are measured every hour.

A survival experiment is grouped under three ranges of oxygen concentration in water: 80 to 99%; 60 to 80%; 30 to 60%, and such an experiment of each range is further grouped under five ranges of carbon dioxide concentration in water: 0 to 20 ppm; 10 to 30 ppm; 20 to 40 ppm; 30 to 50 ppm; 40 to 60 ppm, and as a result, each of 15 models of the survival experiment is performed while its oxygen and carbon dioxide concentration being maintained within each range.

[5.2] Experimental Results

FIG. 3 shows the experimental results of their respective models.

A result for Model Nos. 11 to 15 maintained in oxygen concentration within a range of 30 to 60% is that all the red seabreams of all the models were dead.

Further, a result for Model Nos. 6 to 10 maintained in oxygen concentration within a range of 60 to 80% is that Model Nos. 6, 7 maintained in carbon dioxide concentration within ranges of 0 to 20 ppm, 10 to 30 ppm, respectively, achieved a survival rate of four out of the five red seabreams.

Still further, a result for Model Nos. 1 to 5 maintained in oxygen concentration within a range of 80 to 99% is that Model Nos. 1, 2, 3 maintained in carbon dioxide concentration within ranges of 0 to 20 ppm, 10 to 30 ppm, 20 to 40 ppm, respectively, achieved a survival rate of full of the five red seabreams, and Model No. 4 maintained in carbon dioxide concentration within a range of 30 to 50 ppm achieved a survival rate of three out of the five red seabreams.

[5.3] Findings Derived from Experimental Results

The following findings could be derived from the above-described results.

(1) In the environment (Model Nos. 1 to 3), all the red seabreams were alive, even under conditions of carbon dioxide likely to increase in amount through the respiration of the live red seabreams, such carbon dioxide was exhausted for rendering ammonia harmless (generating ionic ammonium), and thereby capable of maintaining pH in value of a weakly acidic state.

(2) In the environment of the red seabreams found to be dead, contrary to the prediction of an increase in pH and ammonia concentration after an elapsed time of 24 hours, the relevant experimental data did not significantly vary. This appears to be in part because the amount of carbon dioxide to be generated through the respiration and the amount of proteins in wastes and other exuded matter of the red seabreams were originally reduced as a result of the death of the red seabreams.

(3) The carbon dioxide concentration maintained higher than 40 ppm, irrespective of high or low level of oxygen concentration, resulted in the death of the red seabreams, and therefore, an excess amount of carbon dioxide is prevented from being supplied.

In view of this, it is appropriate that the carbon dioxide concentration within the maintenance tank B is maintained within a range of 0 to 40 ppm, and is more preferably maintained within a range of 0 to 30 ppm.

(4) The oxygen concentration maintained lower than 60%, irrespective of high or low carbon dioxide concentration, resulted in the death of the red seabreams. As a result, an excessively smaller amount of oxygen is prevented from being supplied; on the other hand, for the purpose of maintaining the red seabreams to live in the anesthetic state for a long period of time, the elevation of oxygen concentration to an oversaturated state is not necessarily required.

In view of this, it is appropriate that the oxygen concentration within the maintenance tank B is maintained higher than or equal to 60%, and is more preferably maintained higher than or equal to 80%; however, it is not essential that the oxygen concentration be brought into the oversaturated state (100% or higher).

(5) In the above-described experiments, conditions were set such that levels of the oxygen concentration and the carbon dioxide concentration in water measured every hour after a start of the experiments are adjusted to fall within ranges of predetermined conditions. Even if levels acquired by such measurements are substituted by an average of all the acquired levels (the average oxygen concentration and the average carbon dioxide concentration) and if conditions are set such that the average oxygen and carbon dioxide concentrations are adjusted to fall within the ranges of the predetermined conditions, it is highly likely that substantially the same results would be obtained.

(6) Depending upon the types of fish and shellfish put into the water tank and a variety of conditions such as a water temperature, the oxygen concentration and the carbon dioxide concentration tend to vary, and for this reason, a person skilled in the art preferably considers such conditions so as to adjust numerical settings for oxygen concentration and carbon dioxide concentration if appropriate.

If the adjustments are made within numerical ranges specified in this example, it is highly likely that approximately satisfactory results could be obtained.

[6] Conclusion

As described above, by adjusting the oxygen concentration and the carbon dioxide concentration between the environments different in the anesthesia step and the maintenance step, and storing the fish and shellfish in the anesthetic state in such environments, the fish and shellfish could be maintained in the anesthetic state, without being dead, even after a long period of time elapses.

EXAMPLE 2

In EXAMPLE 1 described above, the water tanks (the anesthetic tank A and the maintenance tank B) separated from each other are used in the anesthesia step and the maintenance step, while, in the present invention, a method of both the anesthesia step and the maintenance step may be performed through the use of one water tank.

For example, when the maintenance tank B described in EXAMPLE 1 is used as also serving as the anesthetic tank A, the fish and shellfish are anesthetized in such an anesthetic tank B filled with the anesthetic water A1 maintained in carbon dioxide concentration relatively high, and thereafter, the maintenance in the maintenance tank B is preferably performed by adjusting the carbon dioxide concentration and the oxygen concentration within the tank to predetermined levels, respectively.

REFERENCE NUMERALS

A anesthetic tank
A1 anesthetic water
B maintenance tank
B1 maintenance water
B2 storage box
C transportation means
X fish and shellfish
Y fish and shellfish in anesthetic state
10 main body unit
11 box member
111 support stand
112 fork insertion portion
121 locking portion for lifting
122 through hole
12 lid member
13 storage unit
131 placement stage
132 cover
20 oxygen supply unit
21 oxygen cylinder
22 pump
23 mixing valve
24 first nozzle
30 aeration unit
31 pump
32 second nozzle
40 protein skimmer
41 suction hose
42 reservoir portion
50 control panel
60 battery

What is claimed is:

1. A system for maintaining fish or shellfish for food in an anesthetic state, the system comprising:
   an anesthetic tank configured to contain a body of water for inducing the fish or shellfish to be so anesthetized as to be in an anesthetic state; and
   a maintenance tank configured to adjust carbon dioxide and oxygen concentrations in the water so as to allow the fish or shellfish anesthetized in the anesthetic tank to be maintained in the anesthetic state while being transported, wherein,
   in the anesthesia tank, aeration of the water and/or supply of oxygen to the water is adjusted such that a carbon dioxide concentration is maintained of higher than or equal to 65 ppm and lower than or equal to 85 ppm, and an oxygen concentration is maintained of higher than or equal to 60% and lower than 100%, and wherein,
   in the maintenance tank, aeration of the water and/or supply of oxygen to the water is adjusted such that the carbon dioxide concentration is maintained of higher than or equal to 10 ppm and lower than or equal to 40 ppm, and the oxygen concentration is maintained of higher than or equal to 60% and lower than 100%.

2. The system for maintaining fish or shellfish for food in the anesthetic state according to claim 1, wherein the maintenance tank comprises:
   a main body unit configured to allow the fish or shellfish in the anesthetic state to be put thereinto,
   wherein the oxygen is supplied by an oxygen supply unit so as to adjust the oxygen concentration within the main body unit,
   and wherein the aeration is performed by an aeration unit so as to adjust the carbon dioxide concentration within the main body unit.

3. The system for maintaining the fish or shellfish for food in the anesthetic state according to claim 2, wherein the maintenance tank further comprises a protein skimmer configured to perform impurity-removal within the main body unit.

4. The system for maintaining the fish or shellfish for food in the anesthetic state according to claim 2, wherein
any one of the aeration unit and the oxygen supply unit is capable of adjusting both the carbon dioxide concentration and the oxygen concentration within the main body unit.

5. The system for maintaining the fish or shellfish for food in the anesthetic state according to claim 2, wherein, through the oxygen supply unit, the oxygen concentration, within the main body unit, is maintained higher than or equal to 60% and lower than 100%.

6. The system for maintaining the fish or shellfish for food in the anesthetic state according to claim 2, wherein bubbles, which are supplied through the oxygen supply unit or the aeration unit, have particle diameters distributed such that a mode value is equal to or larger than 100 μm.

7. The system for maintaining the fish or shellfish for food in the anesthetic state according to claim 2, further comprising a storage box, which is capable of having the fish or shellfish stored therein, to be used for putting the fish or shellfish into the main body unit.

8. The system for maintaining the fish or shellfish for food in the anesthetic state according to claim 1, wherein, in the maintenance tank, the carbon dioxide concentration is maintained higher than or equal to 20 ppm and lower than or equal to 40 ppm.

9. The system for maintaining the fish or shellfish for food in the anesthetic state according to claim 8, wherein, in the maintenance tank, the oxygen concentration is maintained higher than or equal to 80%.

10. The system for maintaining the fish or shellfish for food in the anesthetic state according to claim 1, wherein, in the maintenance tank, the oxygen concentration is maintained higher than or equal to 80%.

11. A method of maintaining fish or shellfish for food in an anesthetic state, the method comprising:
an anesthesia step of anesthetizing the fish or shellfish within a water tank having a body of water aerated and/or supplied with oxygen such that a carbon dioxide concentration therein is maintained of higher than or equal to 65 ppm and lower than or equal to 85 ppm, and an oxygen concentration therein is maintained of higher than or equal to 60% and lower than 100%; and
a maintenance step of maintaining, in the anesthetic state, the fish or shellfish anesthetized to be in the anesthetic state in the anesthesia step within a second water tank by adjusting aeration of the water and/or supply of oxygen to the water so as to maintain the carbon dioxide concentration therein higher than or equal to 10 ppm and lower than or equal to 40 ppm, and so as to maintain the oxygen concentration therein higher than or equal to 60% and lower than 100%.

12. The method of maintaining the fish or shellfish for food in the anesthetic state according to claim 11, wherein water within the anesthesia tank is used for water within the maintenance tank in part or in whole.

13. A method of transporting fish or shellfish for food maintained in an anesthetic state, the method comprising:
an anesthesia step of anesthetizing the fish or shellfish within a water tank having a body of water aerated and/or supplied with oxygen such that a carbon dioxide concentration therein is maintained of higher than or equal to 65 ppm and lower than or equal to 85 ppm, and an oxygen concentration therein is maintained of higher than or equal to 60% and lower than 100%;
a transportation step of transporting the fish or shellfish while maintaining the fish or shellfish in the anesthetic state within a second water tank by adjusting aeration of the water and/or supply of oxygen to the water so as to maintain the carbon dioxide concentration therein higher than or equal to 10 ppm and lower than or equal to 40 ppm so as to maintain the oxygen concentration therein higher than or equal to 60% and lower than 100%; and
an awaking step of awaking the fish or shellfish by adjusting aeration of the water and/or supply of oxygen to the water and thereby decreasing the carbon dioxide concentration within the second water tank at a transportation destination.

\* \* \* \* \*